United States Patent [19]

Stottmann

[11] Patent Number: 4,822,172

[45] Date of Patent: Apr. 18, 1989

[54] ELECTRIC FOOD MIXER

[75] Inventor: Richard L. Stottmann, Louisville, Ky.

[73] Assignee: Whirlpool Corporation, Benton Harbor, Mich.

[21] Appl. No.: 137,422

[22] Filed: Dec. 23, 1987

[51] Int. Cl.⁴ ............................................. B01F 7/16
[52] U.S. Cl. ..................................... 366/142; 366/98; 366/601; 318/306
[58] Field of Search ................ 366/142, 601, 279, 69, 366/96, 97, 98, 99, 297; 318/305, 306; 73/901

[56] References Cited

U.S. PATENT DOCUMENTS

| | | | |
|---|---|---|---|
| 4,403,867 | 9/1983 | Duke | 366/142 |
| 4,538,509 | 9/1985 | Ojima | 366/98 |
| 4,747,690 | 5/1988 | Hayashi | 366/141 |

*Primary Examiner*—Robert W. Jenkins
*Attorney, Agent, or Firm*—Mason, Kolehmainen, Rathburn & Wyss

[57] ABSTRACT

An electric food mixer includes an electronic control for operating the mixer in one of a plurality of three modes as selected by a user. In a normal mixing mode, the user selects the speed of the motor and starts and stops the motor by manually actuating a switch. In a timed mixing mode, the user selects the desired running time of the motor as well as the speed of the motor. The motor is started in this mode in response to the manual actuation of a switch, but automatically stops upon the expiration of the selected running time. In a utility timer mode, the mixer is controlled to operate as a utility count-down timer. Upon starting the mixer in the normal mixing mode or in the timed mixing mode, the motor is controlled to start at a slow start-up speed that is less than any of the selectable mixing speeds.

39 Claims, 10 Drawing Sheets

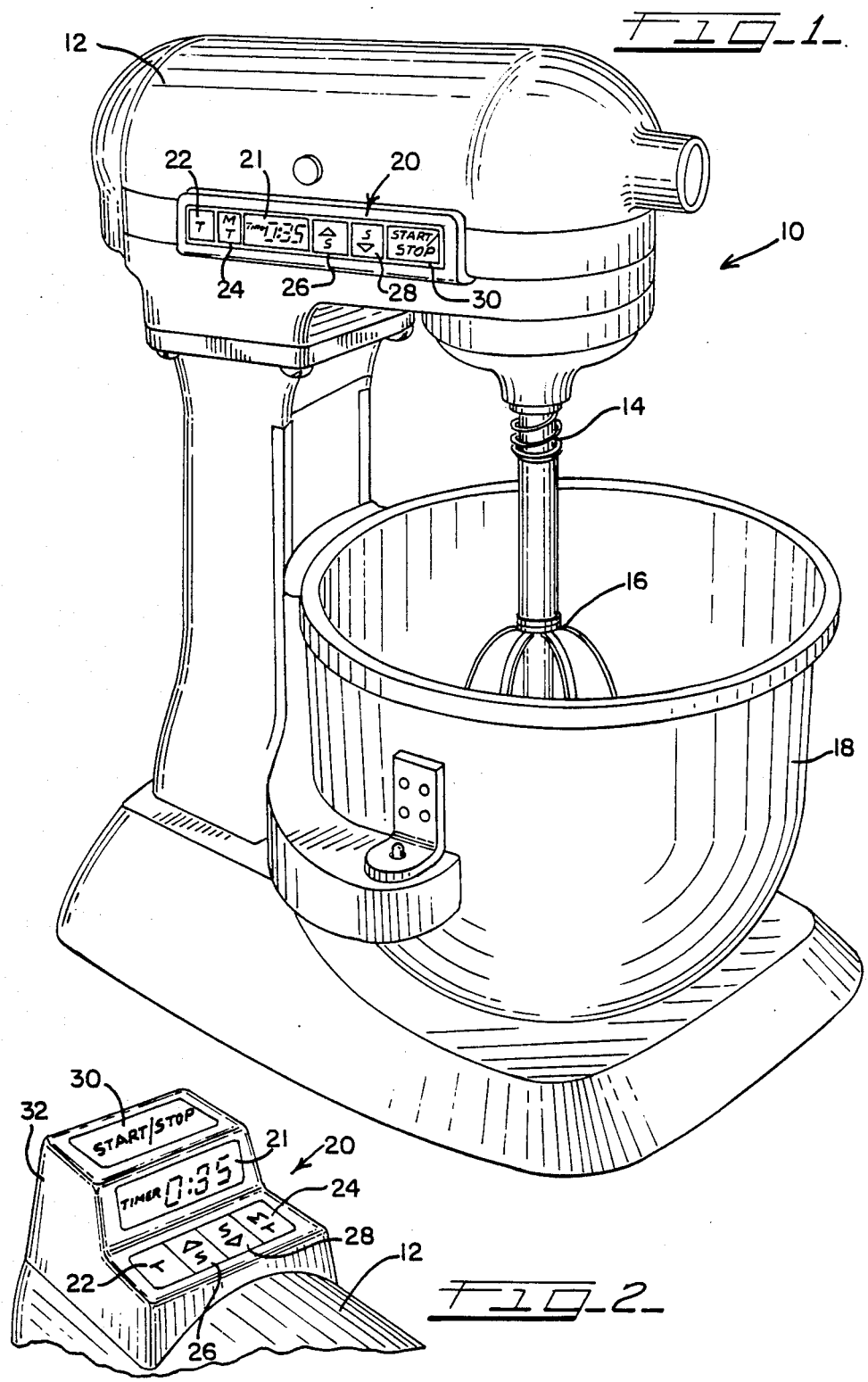

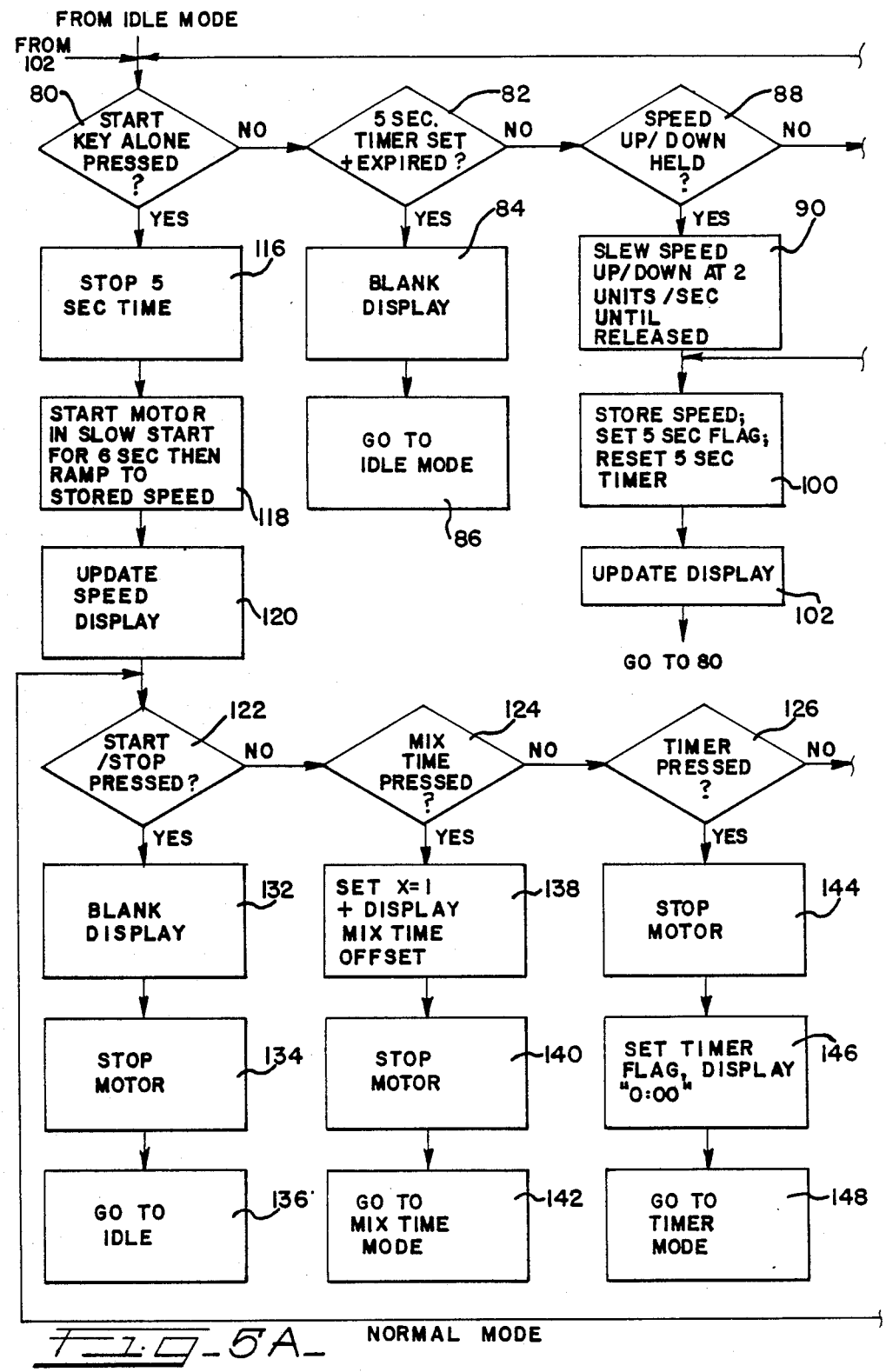
FIG. 5A  NORMAL MODE

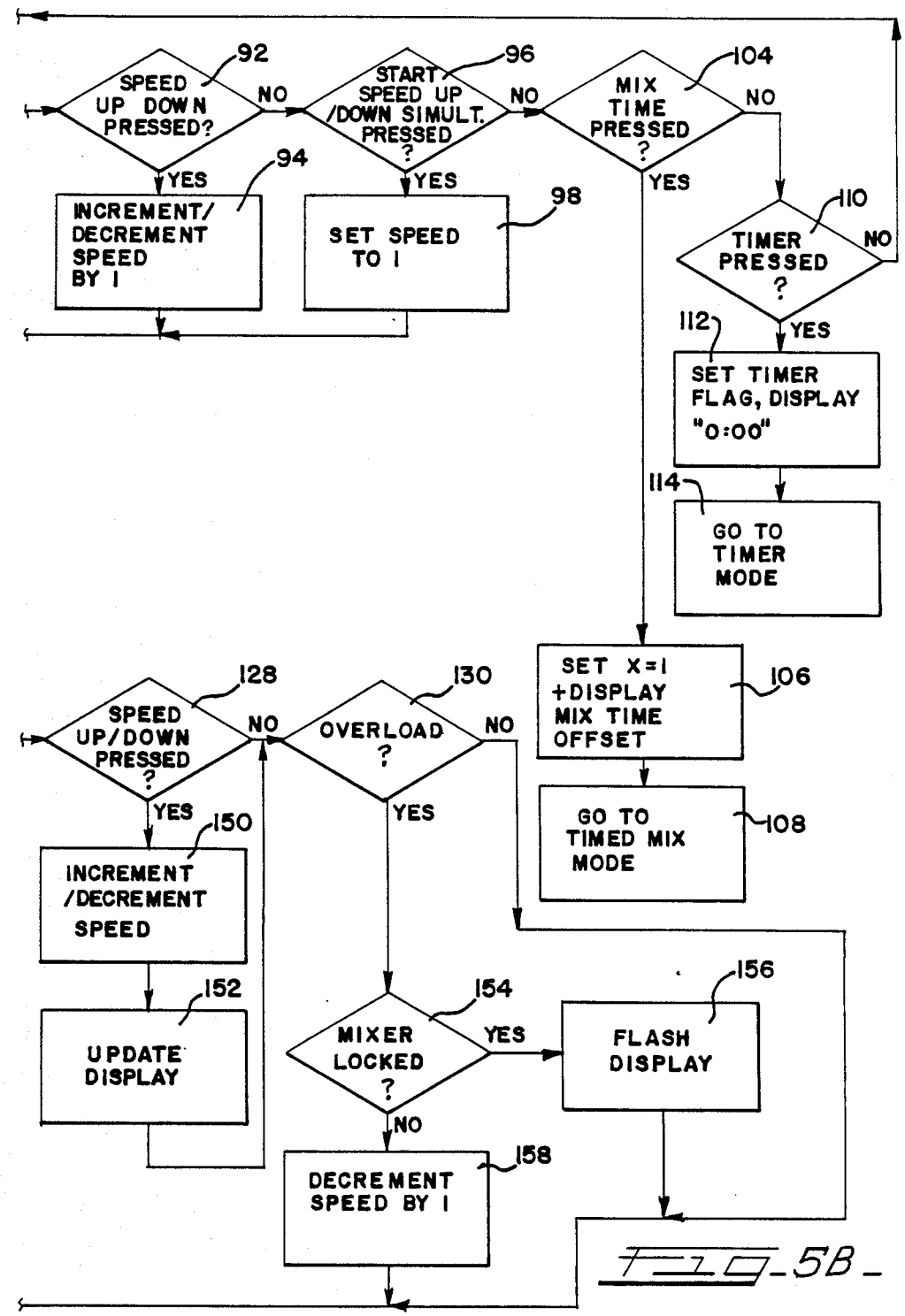
FIG_5B

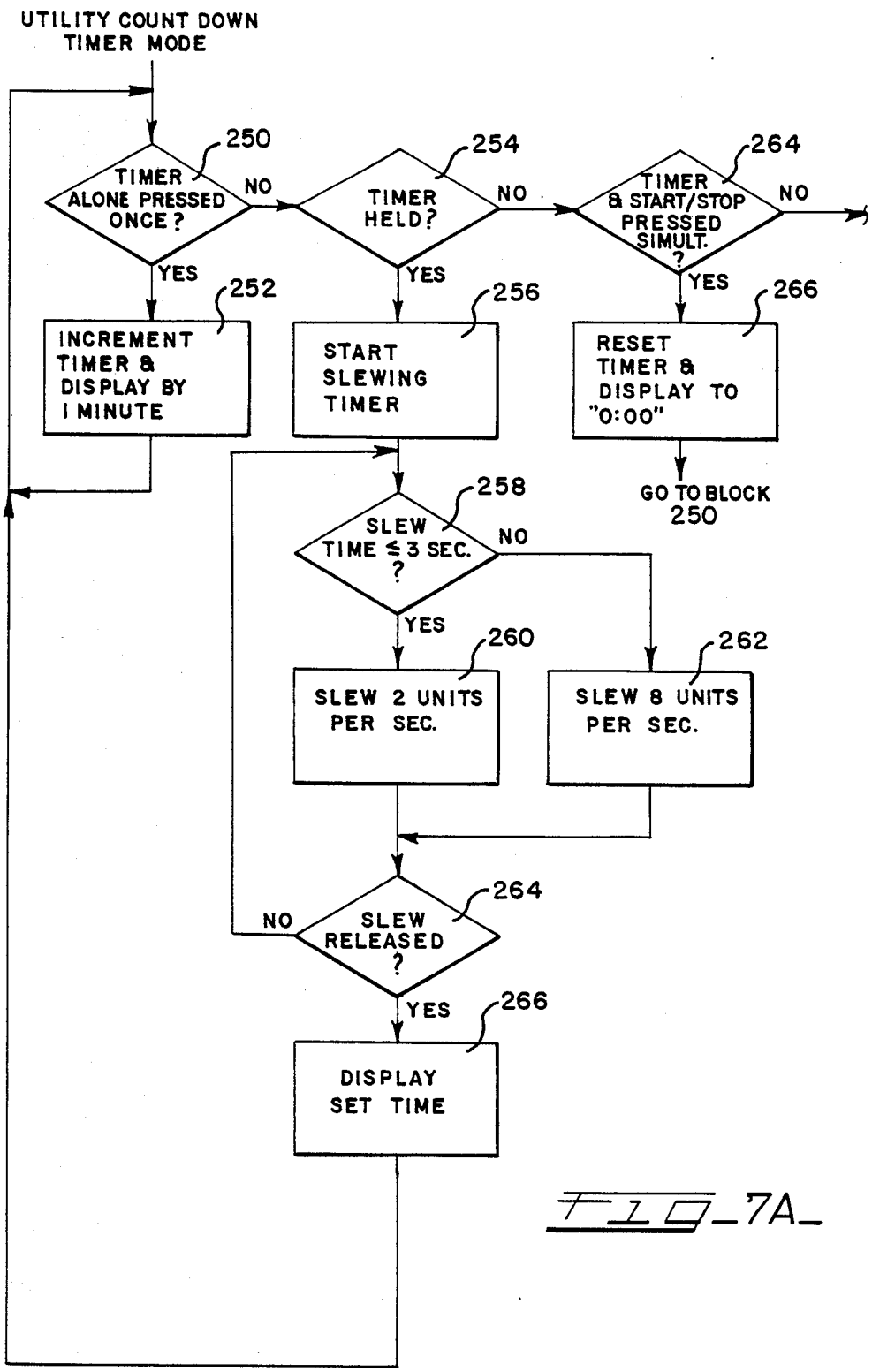
FIG-7A-

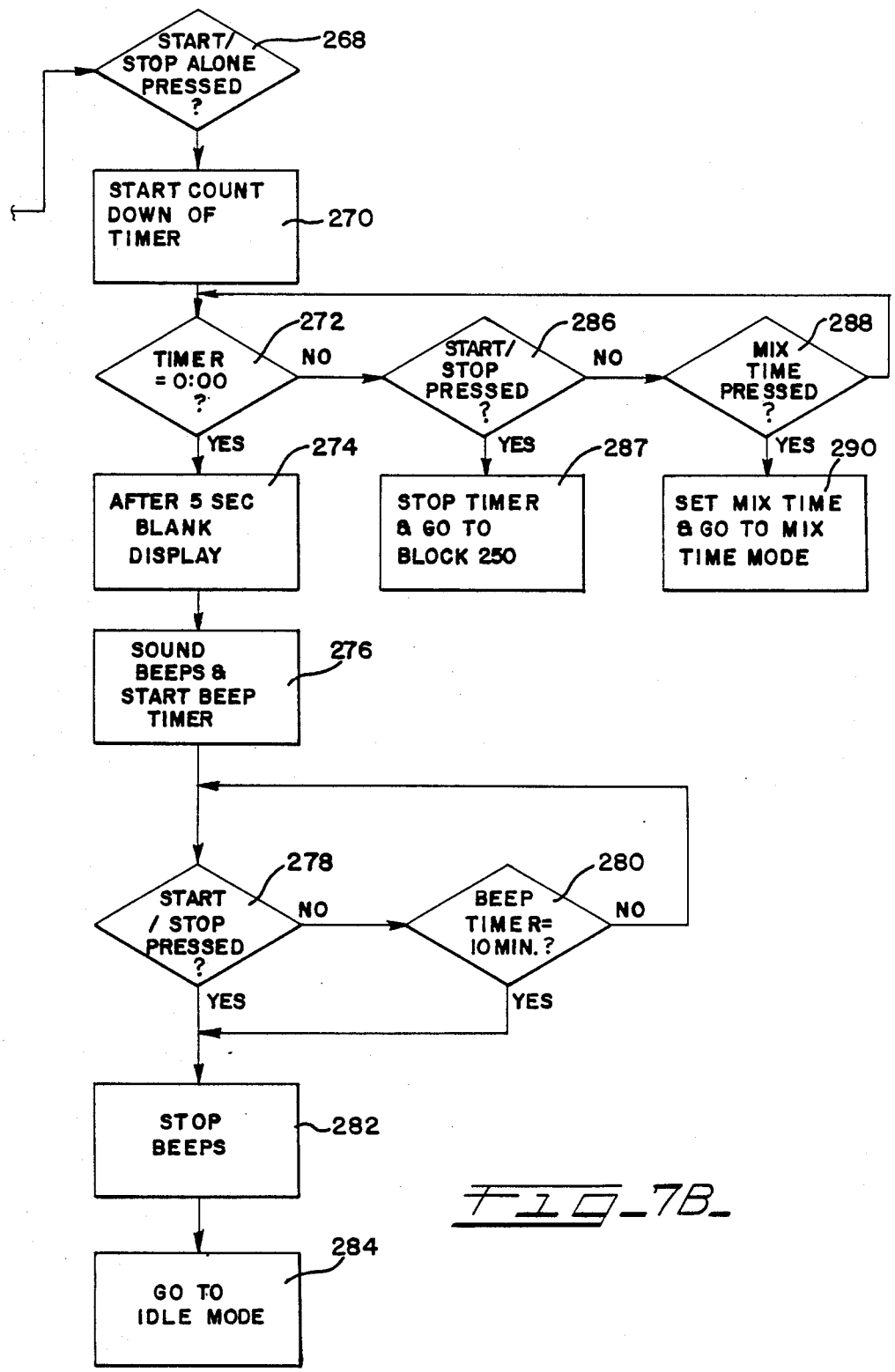
FIG_7B

ELECTRIC FOOD MIXER

FIELD OF THE INVENTION

The present invention relates to an electric food mixer and, more particularly, to an electronic control for operating an electric food mixer in a plurality of modes including a normal mixing mode and a timed mixing mode and a utility timer mode wherein the control further provides a slow start for the mixer's motor.

DESCRIPTION OF THE PRIOR ART

Known electric food mixers typically include a speed selection switch which is movable from an off position through a series of increasing speed positions, wherein the mixer motor is started in response to movement of the speed selection switch from the off position. These known mixers are operable in only one mode, a normal mixing mode, wherein the user starts and stops the mixer motor by manually moving the speed selection switch. When the speed selection switch is moved from an off position, the motors of these mixers are typically controlled to start at the selected mixing speed. However, starting the mixer motor at a mixing speed often results in food being thrown from the mixing bowl and splattered onto surrounding surfaces.

SUMMARY OF THE INVENTION

In accordance with the present invention, the disadvantages of prior art food mixers have been overcome. The electric food mixer of the present invention includes an electronic control for operating the mixer in a plurality of modes, including a normal mixing mode, a timed mixing mode and a utility timer mode. The control further provides a slow start for the mixer's motor when the mixer is operated in either the normal mixing mode or the timed mixing mode.

The mixer of the present invention includes a number of switches to allow the user to select the operating mode of the mixer, the speed of the mixer motor and the settings of two count-down timers, a mix timer and a utility timer. The mixer also includes a digital display for displaying speed and time information.

When operated in the normal mixing mode, the mixer control is responsive to the actuation of a start/stop switch to start and operate the mixer motor at a slow start-up speed for a predetermined period of time, wherein the start-up speed is less than the slowest of the selectable mixing speeds. When the mixer motor has been running at the start-up speed for the predetermined period of time, the mixer motor is controlled to accelerate at a predetermined rate to the selected speed. The mixer motor runs at the selected speed in the normal mixing mode until the start/stop switch is actuated again or until the mode of the mixer is changed, at which point the motor is stopped.

In the timed mixing mode, the user selects not only the speed of the mixer motor but also the running time of the mixer. The mixer motor in the timed mixing mode is started at the slow start-up speed as in the normal mode. At the expiration of the slow start time period, the mixer motor is controlled to accelerate to the selected speed and runs continuously until the selected running time of the mixer has expired; the start/stop switch has been actuated or a mode switch has been actuated. Because the mixer motor is automatically shut off at the expiration of the selected running time of the mixer, users may obtain excellent results without over mixing or under mixing even though they might not have a very good sense of time. The timed mixing feature of the present invention also frees the user from continuously monitoring the mixer. While the mixer is running in the timed mixing mode, the user is free to perform other activities since the mixer control automatically shuts off the motor at the expiration of the selected running time.

The mixer may be operated in the utility timer mode to provide a general purpose utility count-down timer when the mixer motor is not running. This feature encourages the user to leave the mixer out on a counter where it is more accessible.

These and other objects, advantages and novel features of the present invention, as well as details of an illustrative embodiment thereof, will be more fully understood from the following description and the drawing.

BRIEF DESCRIPTION OF THE DRAWING

FIG. 1 is a perspective view of an electric food mixer constructed in accordance with the principles of the present invention;

FIG. 2 is a partial perspective view of the mixer of FIG. 1 illustrating an alternative location for the user selection switches and display;

FIGS. 5a and 5b form a flow chart illustrating the normal mixing mode of the mixer of the present invention;

FIGS. 7a and 7b form a flow chart illustrating the utility timer mode of the mixer of the present invention.

DESCRIPTION OF THE PREFERRED EMBODIMENT

Figure 3:
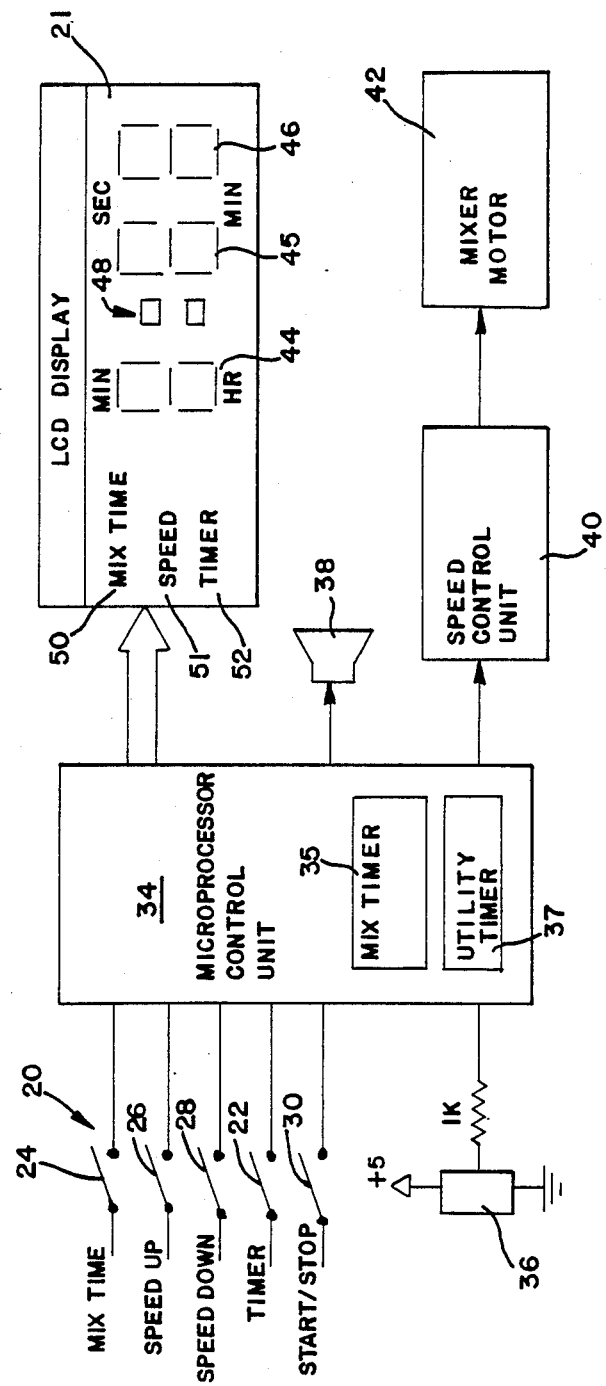
FIG. 3 is a block diagram of an electronic control of the mixer of the present invention.

An electric food mixer 10, as shown in FIG. 1, constructed in accordance with the principles of the present invention includes a motor disposed within a motor head housing 12 and an electronic control for controlling the operation of the motor and of the mixer. The motor is coupled to at least one beater shaft 14 that is, in turn, coupled to at least one beater 16 to impart rotation to the shaft 14 and the beater 16. Obviously, the mixer 10 can be designed to operate with more than one beater 16. In a preferred embodiment of the mixer 10, the beater 16 is moved around a stationary mixing bowl 18 while, at the same time, rotating in the opposite direction about its own axis to provide planetary mixing action. Alternatively, the mixer 10 can be designed to rotate the mixing bowl 18 on a rotatable support base and, if desired, to maintain the axis of rotation of the beater 16 stationary.

The mixer 10 has five user actuable input switches, generally designated 20, and a digital display 21. A timer switch 22, when actuated as discussed below, causes the mixer 10 to operate in a utility timer mode. A mix time switch 24, when actuated as discussed below, causes the mixer 10 to operate in a timed mixing mode. Speed selection is provided by a speed-up switch 26 and a speed-down switch 28. The electronic mixer control is responsive to each actuation of the speed-up switch 26 to display the next highest selectable speed on the display 21 and is responsive to each actuation of the speed-down switch to display the next lowest selectable speed on the display 21. A user may slew the speed display up or down by holding one of the respective switches 26 and 28 closed wherein the slew rate for incrementing or decrementing the speed display is two speed selections per second. A start/stop switch 30 is provided for starting and stopping the mixer when used alone, and when touched simultaneously with another of the switches, the switch 30 resets the selected speed or time.

The switches 20 and display 21 may be disposed on a side of the motor head 12 as shown in FIG. 1. Alternatively, the switches 20 and display 21 may be disposed on a block 32 mounted at the rear of and on top of the motor head 12 as shown in FIG. 2. In the embodiment of the mixer 10 shown in FIG. 2, the start/stop switch 30 is disposed on the top of the block 32 forming the uppermost surface of the mixer so that if any problem arises, the user merely slaps the uppermost surface to stop the motor. For safety reasons, this is the preferred location of the start/stop switch.

The electronic control of mixer 10 of the present invention, as shown in FIG. 3, includes a microprocessor control unit 34 which is responsive to the user selection switches 20 for controlling a display 21, a speaker 38 and, through a speed control unit 40, the speed of the mixer motor 42.

The display 21 is preferably a liquid crystal display capable of displaying three numeric characters 44, 45 and 46; a colon 48 and one of three terms 50-52: "MIX TIME", "SPEED" and "TIMER". If the numeric characters 44-46 are depicting time during the timed mixing mode, the MIX TIME term 50 is shown on the display 21 with character 44 representing the selected mixing time in minutes and characters 45 and 46 representing the selected mixing time in seconds. If the characters 44-46 are depicting time in the utility timer mode, the TIMER term 52 is shown on the display 21 with the character 44 representing hours and the numeric characters 45 and 46 representing minutes. When depicting speed, the SPEED term 51 is shown on the display 21 with characters 45 and 46 representing one of the speed selections 1 through 10 as discussed below.

The speaker 38 is controlled by the microprocessor control unit 34 to periodically produce a series of audible tones in the form of beeps or double beeps when the mixer is operating in the utility timer mode and the set time has expired. The microprocessor controls the speaker to sound the beeps for a period of 10 minutes after the expiration of the set time unless the start/stop switch 30 is touched in which case the microprocessor 34 stops the beeps prior to the expiration of the ten minute period.

A Hall effect sensor 36 senses the speed of the mixer motor shaft and provides a signal representative thereof to the microprocessor control unit 34. The microprocessor control unit 34 is responsive to the output of the Hall effect sensor 36 and to the actuation of the speed-up and speed-down switches 26 and 28 for directing the speed control unit 40 to control the speed of the mixer motor 42.

The microprocessor control unit 34 controls the mixer motor 42 and the display 21 in a normal mixing mode, the timed mixing mode and the utility timer mode, generally as follows, a detailed description being provided with reference to FIGS. 5-7. In the normal mixing mode, the mixer motor 42 is started at a slow start-up speed, for example, 1000 RPM, when the mixer enters this mode in response to the actuation of the start/stop switch 30. The mixer motor 42 is controlled to run at the start-up speed for a predetermined period of time such as 6 seconds, after which the mixer motor 42 is controlled t accelerate to the selected speed. The mixer motor 42 continues running in the normal mode until the user actuates the start/stop switch 30, the timer switch 22 or the mix time switch 24 at which time the motor 42 is stopped. During the normal mixing mode, the display 21 shows the selected speed continuously.

The timed mixing mode is entered in response to the user touching the mix time switch 24. In response to the first touch of the mix time switch 24, a software timer, the mix timer 35, is set to 0:15, the display 21 is set to "MIX TIME 0:15" and the mixer motor 42 is stopped if it was running. Upon each subsequent touch of the mix time switch 24, the mix timer 35 and the display 21 are incremented to the next successive selectable mix time or they are slewed through the mix times if the mix time switch 24 is held. When the display 21 shows the desired mix time, the user starts the mixer 10 by actuating the start/stop switch 30. When the mixer motor 42 is started in the timed mixing mode, the display 21 is controlled to display the selected mixing speed for the first 5 seconds of running time and to thereafter display the remaining running time held in the mix timer 35. The mixer 10 runs without interruption in the timed mixing mode until the set mix time has expired, the start/stop switch 30 has been touched or the start/stop switch 30 and the mix time switch 24 have been touched simultaneously. In the latter instance, the mix timer 35 and the display 21 are reset to 0:00. While running in the timed mixing mode, if a user stops the mixer motor 42 by actuating the start/stop switch 30, the mix timer 35 is also stopped. When the mixer motor 42 is started again, the mix timer 35 counts down from the time held in the timer when the mixer 10 was stopped. Further, while running in the timed mixing mode, the speed of the mixer motor 42 may be changed without stopping the motor 42.

The utility timer mode is entered by actuating the timer switch 22. Upon the first actuation of the timer switch 22, a software timer, the utility timer 37, is set to 0:00 and the display 21 is set to "TIMER 0:00". Upon the second actuation of the timer switch 22, the display 21 and timer 37 are advanced by one minute. The timer 37 may be advanced one minute for each subsequent touch or the timer 37 may be slewed by holding down the timer switch 22. The timer 37 will slew at a first rate of two units per second for the first three seconds that the timer switch 22 is held and thereafter will slew at a second rate of eight units per second until the timer switch 22 is released. After setting the timer, the timer begins counting down upon actuation of the start/stop switch 30. Upon the expiration of the time set in the utility timer, the mixer 10 sounds a double beep until the start/stop switch 30 is actuated or ten minutes has elapsed, whichever occurs first. The utility timer 37 may be automatically reset to 0:00 by simultaneously actuating the start/stop switch 30 and the timer switch 22.

Figure 4:
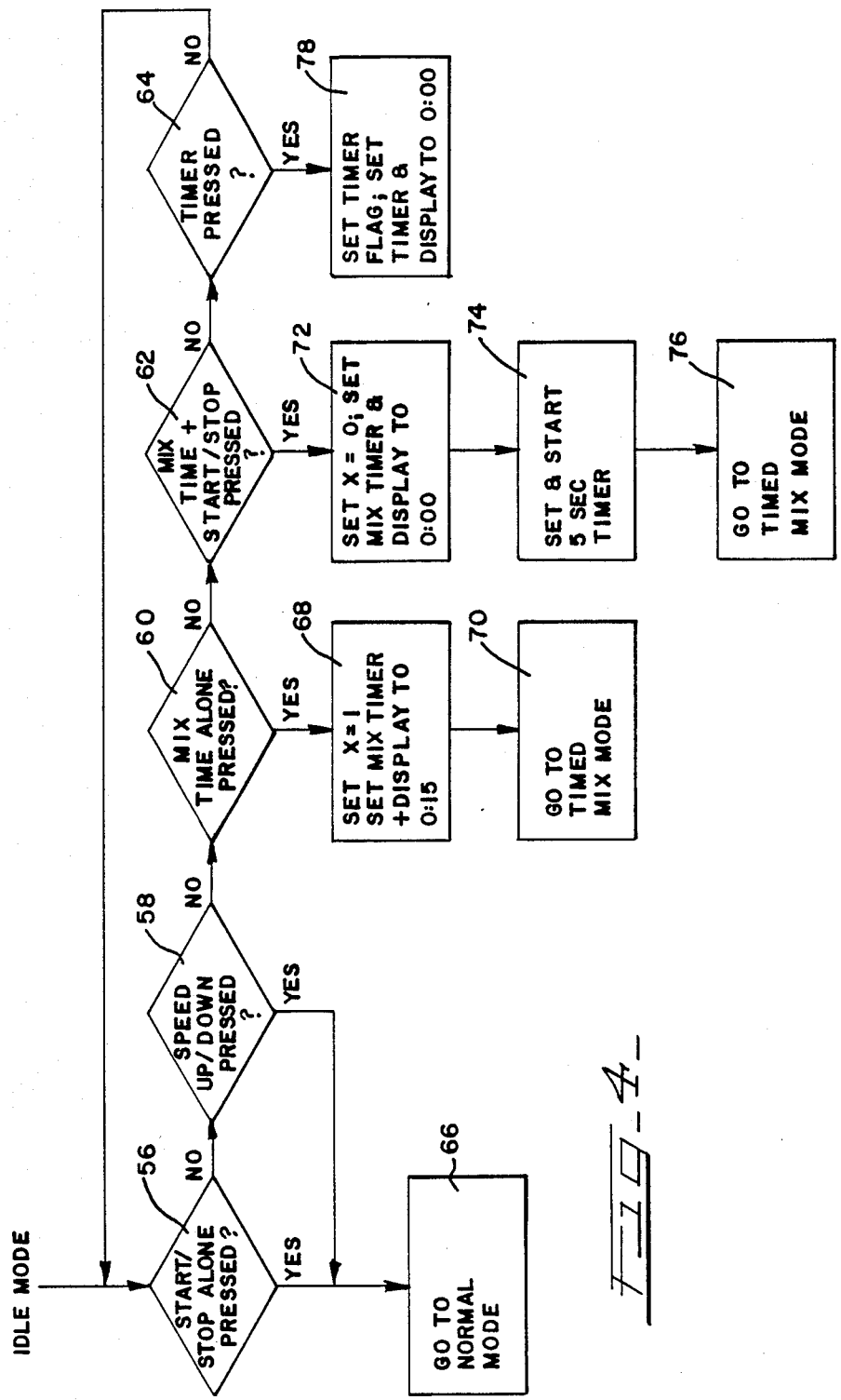
FIG. 4 is a flow chart illustrating the idle mode of the mixer of the present invention.

The microprocessor control unit 34 operates in an idle mode as depicted in FIG. 4 when the mixer 10 is powered and not operating in any other mode. In the idle mode, the microprocessor control unit 34 monitors, at blocks 56, 58, 60, 62 and 64, the user selection switches 20 and responds to the actuation of the switches as follows. If the microprocessor 34, at block 56, determines that the start/stop switch 30, alone, has been touched, the microprocessor 34, at block 66, goes to the normal mode as depicted in FIGS. 5a and 5b. If the microprocessor 34 determines that either the speed-up switch 26 or the speed-down switch 28 has been touched, the microprocessor also goes to the normal mode at block 66. If the microprocessor control unit 34 determines at block 60 that the mix time switch 24, alone, has been touched, the microprocessor 34, at block 68, sets an index, X, equal to 1. At block 68 the microprocessor also sets the mix timer 35 to 0:15 and the display 21 to "MIX TIME 0:15". Thereafter, the microprocessor control unit 34, at block 70, goes to the timed mixing mode depicted in FIGS. 6a–6c. If the microprocessor control unit 34 determines, at block 62, that the mix time switch 24 and the start/stop switch 30 are touched simultaneously, the microprocessor 34, at block 72, sets the index, X, equal to 0, the mix timer 35 to 0:00 and the display 21 to "MIX TIME 0:00". At block 74 the microprocessor control unit 34 sets and starts a five-second timer and at block 76 goes to the timed mixing mode. If the microprocessor control unit 34 determines at block 64 that the timer switch 22 has been touched, the microprocessor 34 at block 78 sets a utility timer flag. At block 78, the microprocessor 34 also sets the utility timer 37 to 0:00 and the display 21 to "TIMER 0:00".

The microprocessor control unit 34 controls the mixer 10 to operate in the normal mixing mode when the mixer 10 has been operating in the idle mode and the start/stop switch 30, alone, has been touched or one of the speed switches 26 or 28 has been touched. When the microprocessor control unit 34 enters the normal mode of operation, as depicted in FIGS. 5a and 5b, from the idle mode, the microprocessor 34, at block 80, determines whether the start/stop switch, alone, has been touched. If not, the microprocessor control unit 34 determines at block 82 whether the five-second timer flag has been set and whether the five-second timer has expired. If the five-second timer flag has been set and the timer has expired, the microprocessor control unit 34 blanks the display 21 at block 84 and at block 86, returns to the idle mode. The five-second timer is used to blank the display 21, such as when no other switch has been touched for five seconds after a speed selection has been made, to eliminate fears that the mixer is always "on". If the five-second timer flag has not been set or the timer has not expired, the microprocessor 34 proceeds to block 88 to determine whether either the speed-up switch 26 or the speed-down switch 28 is being held.

If one of the speed switches 26 or 28 is being held, the microprocessor control unit 34 at block 90 slews the speed display 21 up or down at a rate of two units per second through a series of selectable speeds until the actuated switch is released. If one of the speed switches 26 or 28 is not being held down but is being touched as determined at block 90, the microprocessor control unit 34 increments or decrements the speed to the next highest or lowest selectable speed. The mixer 10 has ten selectable mixing speeds, speed selections 1 through 10, wherein speed selection 1 represents a motor speed of approximately 2160 RPM; speed selection 2 represents a motor speed of approximately 2830 RPM; speed selection 3 represents a motor speed of approximately 4083 RPM; speed selection 4 represents a motor speed of approximately 5336 RPM; speed selection 5 represents a motor speed of approximately 6558 RPM; speed selection 6 represents a motor speed of approximately 7780 RPM; speed selection 7 represents a motor speed of approximately 8750 RPM; speed selection 8 represents a motor speed of approximately 9720 RPM; speed selection 9 represents a motor speed of approximately 10910 RPM and speed selection 10 represents a motor speed of approximately 12100 RPM.

If the start/stop switch is touched simultaneously with either the speed-up switch 26 or the speed-down switch 28, as determined by the microprocessor at the block 96, the microprocessor unit 34 at block 98 sets the speed to speed selection 1. From blocks 90, 94 and 98, the microprocessor control unit 34 proceeds to block 100 to store the speed selection made by the user. At block 100, the microprocessor 34 also sets the five-second timer flag and resets the five-second timer so that, as discussed above, if no other switch is touched for five seconds after a speed selection has been made, the microprocessor 34 will blank the display at block 84. From block 100, the microprocessor control unit 34 proceeds to block 102 to update the display 21 by depicting the SPEED term 51 and the selected speed using characters 45 and 46. Thereafter, the microprocessor 34 proceeds to block 80.

If the microprocessor control unit 34 determines that mix time switch 24 has been touched, the microprocessor control unit 34 at block 106 sets the index, X, equal to 1 and also sets the display 21 and mix timer 35. If the mix time switch 24 is touched alone, the microprocessor 34 at block 106 sets the mix timer 35 to 0:15 and sets the display 21 to "MIX TIME 0:15". If the mix time switch 24 is touched simultaneously with the start/stop switch 30, the microprocessor 34 at block 16 sets the mix timer 35 to 0:00 and the display 21 to "MIX TIME 0:00". Thereafter, at block 108, the microprocessor control unit 34 proceeds to the timed mixing mode depicted in FIGS. 6a–6c. If the microprocessor determines at block 110 that the timer switch 22 has been pressed, the microprocessor 34 at block 112 sets a timer flag and sets the display to "TIMER 0:00". Thereafter, at block 114, the microprocessor control unit 34 proceeds to the utility timer mode depicted in FIGS. 7a and 7b.

If the microprocessor control unit 34 determines at block 80 that the start/stop switch 30, alone, has been touched, the microprocessor 34 at block 116 stops the five-second timer if the five-second timer flag has been set. At block 118, the microprocessor control unit 34 starts the motor 42 at the slow, start-up speed of 1000 RPM. The start-up speed may be other than 1000 RPM, the only limitation thereon being that it is less than the slowest selectable mixing speed. The microprocessor 34 controls the motor 42 to operate at the slow start-up speed for a predetermined period of time, such as six seconds, after which the microprocessor through the speed control unit 40 controls the mixer motor 42 to accelerate at a rate of 33.7 rev./sec./sec. to the last stored speed. If no speed is stored, for example, where power to the mixer 10 has been lost and subsequently restored, the microprocessor control unit 34 accelerates from the slow start-up speed to a default speed which may be, for example, speed selection 2. Thereafter, at block 120, the microprocessor control unit 34 updates the display 21 to depict the SPEED term 51 and the operating speed of the motor 42 represented by one of the speed selections 1 through 10.

The motor 42 continues running at the stored speed until one of the user selection switches 20 has been touched as determined by the microprocessor 34 at blocks 122, 124, 126 and 128 or an overload condition exists as determined at block 130. If the start/stop switch 30 has been touched, as determined by the microprocessor 34 at block 122, the microprocessor blanks the display 21 at block 132 and at block 134 stops the mixer motor 42. Thereafter, the microprocessor control unit 34 returns to the idle mode at block 136.

If the mix time switch 24 is touched while the mixer motor 42 is running in the normal mode, as determined by the microprocessor control unit 34 at block 124, at block 138, the microprocessor control unit 34 sets the index, X, equal to 1. At block 138, the microprocessor control unit 34 also sets the mix timer 35 to 0:15 and the display 21 to "MIX TIME 0:15" if the mix time switch 24 is touched alone. Alternatively, if the mix time switch 24 is touched simultaneously with the start/stop switch 30, the microprocessor control unit 34, at block 138, starts a five-second timer and sets the mix timer 35 to 0:00 and the display 21 to "MIX TIME 0:00". Thereafter, at block 140, the microprocessor control unit 34 stops the motor 42 and at block 142 proceeds to the MIX TIME mode depicted in FIGS. 6a–6c.

If the timer switch 22 is pressed while the mixer motor 42 is running in the normal mixing mode, as determined by the microprocessor 34 at block 126, the microprocessor control unit 34 stops the motor 42 at block 144. At block 146, the microprocessor control unit 34 sets the timer flag and further sets the display 21 to "TIMER 0:00". Thereafter, at block 148, the microprocessor control unit 34 proceeds to the utility timer mode depicted in FIGS. 7a and 7b.

While the motor 42 is running in the normal mixing mode, the speed may be changed without stopping the motor 42. If the motor 42 is running and the speed-up switch 26 or the speed-down switch 28 is touched, as determined by the microprocessor control unit 34 at block 128, the microprocessor controls the motor 42 to accelerate at a rate of 33.7 rev./sec./sec. to the next highest or lowest speed selection at block 150. Thereafter, at block 152, the microprocessor control unit 34 updates the display 21 to display the currently selected running speed of the mixer motor 42.

At block 130, the microprocessor control unit 34 monitors the load on the motor 42 to determine whether an overload condition exists. If an overload condition does exist, the microprocessor control unit 34 determines at block 154 whether the mixer 10 is locked or stalled wherein a locked or stalled condition is defined to be a motor speed of 100 RPM or less. If the microprocessor 34 determines that the mixer 10 is locked or stalled at block 154, the microprocessor at block 156 flashes the display to alert the user to the condition. If the microprocessor 34 determines that an overload exists, but that the mixer is not locked or stalled at block 158, the microprocessor 34 decrements the speed of the motor 42 to the next lowest speed selection. From blocks 158 and 156, the microprocessor control unit 34 proceeds to block 122. If an overload condition other than a stalled or locked condition still exists the microprocessor will continue to loop through the overload processing blocks 130, 154 and 158, decrementing the speed of the motor 42 each time by one speed selection until the overload is removed or the start/stop switch 30 or mode switches 22 or 24 are touched.

Figure 6A:
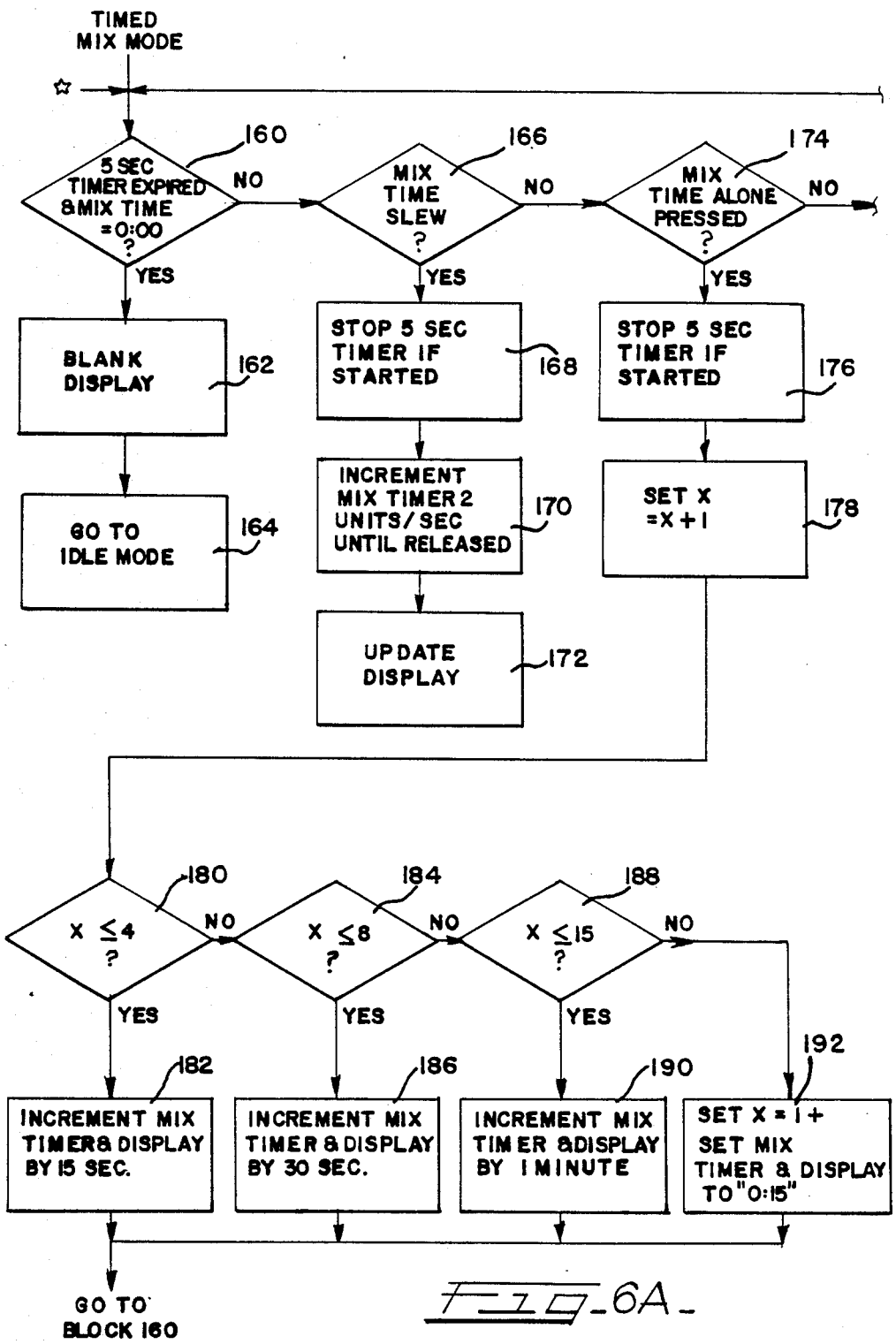
FIGS. 6a, 6b and 6c form a flow chart illustrating the timed mixing mode of the mixer of the present invention.
Figure 6B:
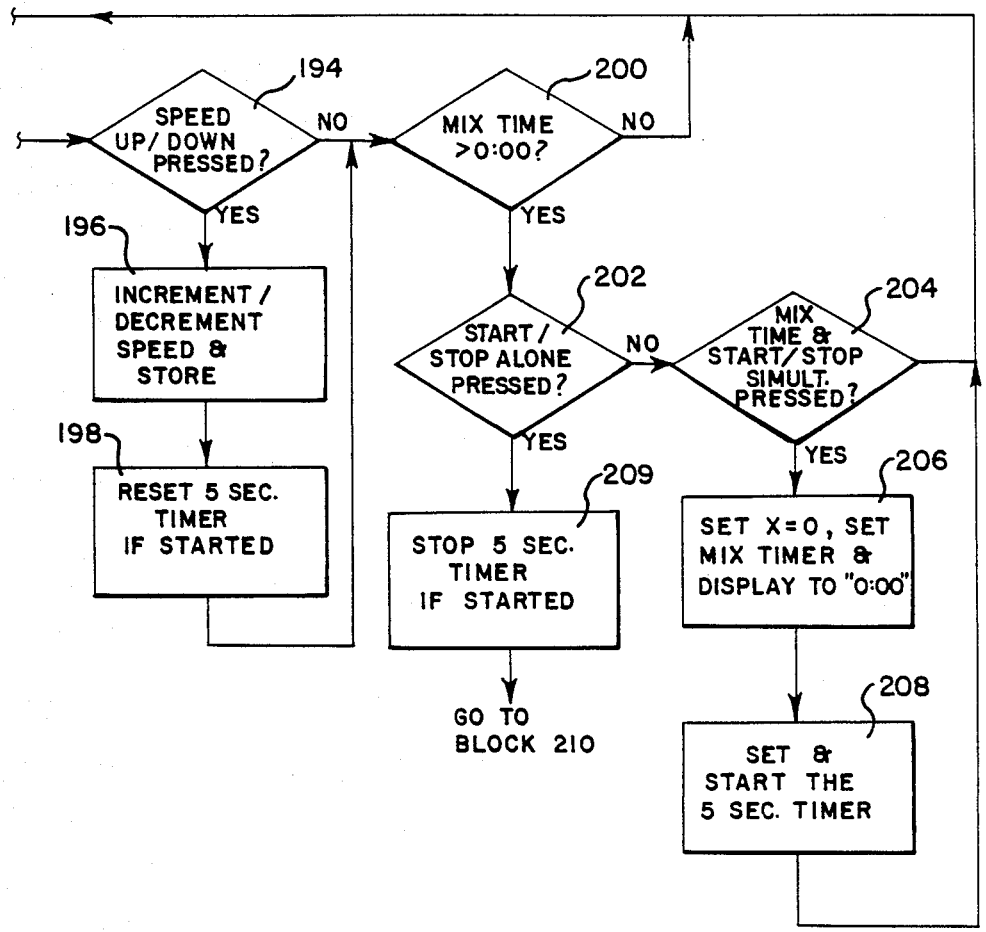
Figure 6C:
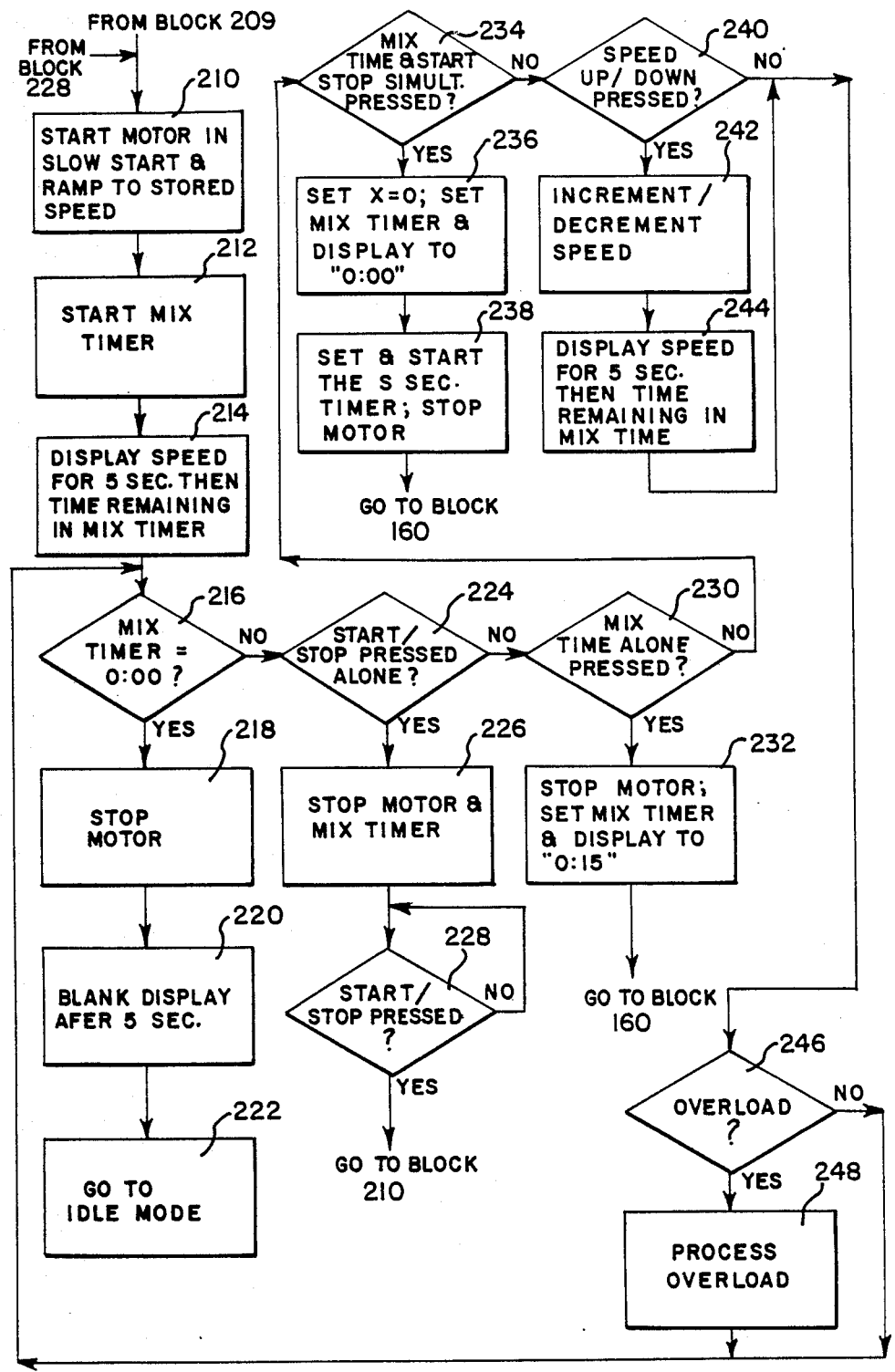

In the timed mixing mode as shown in FIGS. 6a–6c, the user selects the running time of the mixer motor 42 and when the microprocessor control unit 34 determines that the motor 42 has been running for that selected period of time, the microprocessor automatically stops the motor 42. This feature frees the user from constantly attending the mixer 10 to enable the user to perform other activities while the mixer 10 is operating in this mode. This feature also aids users having a poor sense of time.

Upon entering the timed mixing mode, the microprocessor control unit 34 determines at block 160 whether the five-second timer has expired and whether the mix time is equal to 0:00. If the timer 35 has expired and the mix time is equal to 0:00, the microprocessor control unit 34 at block 162 blanks the display and at block 164 returns to the idle mode. The five-second timer is set in the timed mixing mode when the mix time switch 24 and the start/stop switch 30 are simultaneously touched and the display shows "MIX TIME 0:00" as described below. Blanking the display when no switch has been touched for five seconds under these circumstances eliminates fears that the mixer is always "on".

The microprocessor control unit 34 next determines at block 166 whether the mix time switch 24 is being held to slew the display. If it is, the microprocessor at block 168 stops the five-second timer if it is started, and at block 170 increments the mix timer 35 at a rate of two selectable mix times per second until the mix time switch 24 is released, wherein the selectable mix times are as discussed below. As the mix timer 35 is slewed, the index X is also incremented in accordance therewith. Thereafter, at block 172, the microprocessor control unit 34 updates the display 21 to depict the MIX TIME term 50 and the selected mix time of the mixer motor 42. If the mix time switch 24 is not being held down, but is touched alone as determined by the microprocessor control unit 34 at block 174, the microprocessor, at block 176 stops the five-second timer if it is started and sets the index X equal to X+1 at block 178. At block 180 the microprocessor determines whether the index X is less than or equal to 4 and if it is, the microprocessor control unit 34 at block 182, increments the mix timer 35 and display 21 by fifteen seconds. If the microprocessor control unit 34 determines that X is greater than 4 but less than or equal to 8 as determined at block 184, the microprocessor 34 at block 186 increments the mix timer 35 and display 21 by thirty seconds. If the microprocessor control unit 34 determines at block 188 that X is greater than 8 but less than or equal to 15, the microprocessor control unit 34, at block 190, increments the mix timer 35 and display 21 by one minute. If the microprocessor determines at block 188 that X is greater than 15, at block 192, the microprocessor sets X equal to 1 and sets the mix timer 35 and display 21 to 0:15. The display depicts the following sequence of selectable times in response to each successive touch of the mix time switch 24 under the control of blocks 182, 186, 190 and 192: 0:15, 0:30, 0:45, 1:00, 1:30, 2:00, 2:30, 3:00, 4:00, 5:00, 6:00, 7:00, 8:00, 9:00 and 10:00 wherein an additional touch causes the display to repeat the sequence starting at 0:15.

At block 194, the microprocessor 34 determines whether the speed-up switch 26 or the speed-down switch 28 has been touched. If either of the speed switches 26 or 28 has been pressed, the microprocessor 34 at block 196 increments or decrements the speed and stores the newly selected speed at block 196. Thereafter, at block 198 the microprocessor 34 resets the five-second timer if it has already been started.

The microprocessor control unit 34 at block 200 determines whether the selected mix time is greater than 0:00 and if it is, the microprocessor at block 202 determines whether the start/stop switch 30, alone, has been touched. If it has, the microprocessor 34 at block 209 stops the five-second timer if it was started and proceeds to block 210 depicted in FIG. 6c. If the start/stop switch 30 has not been touched alone as determined at block 202, the microprocessor 34 at block 204 determines whether the mix time switch 24 and the start/stop switch 30 have been touched simultaneously. If they have, at block 206 the microprocessor 34 sets the index, X, equal to 0. At block 206 the microprocessor 34 also sets the mix timer 35 to 0:00 and the display to "MIX TIME 0:00". Thereafter, at block 208, the microprocessor control unit 34 sets and starts the five-second timer so that if no other switch is touched within five seconds of resetting the mix timer 35 to 0:00, the microprocessor 34 at blocks 162 and 164 will blank the display and will return to the idle mode.

As shown in FIG. 6c, the microprocessor 34, in response to actuation of the start/stop switch 30, starts the motor 42 in the timed mixing mode at the slow start up speed, 1000 RPM, for a predetermined period of time of six seconds and thereafter accelerates at a rate of 33.7 rev./sec./sec. to the stored speed or if there is not a stored speed to the default speed, speed selection 2. At block 212, the microprocessor control unit 34 starts the mix timer 35 so that it counts down in one second intervals from the time set at blocks 170, 182, 186, 190 or 192. At block 214 the microprocessor 34 displays the stored speed for five seconds and thereafter the time held in the mix timer 35 so that when the motor 42 is started in the timed mixing mode the display 21 first shows the selected speed and thereafter the remaining mixing time.

When the mix timer 35 counts down to 0:00 as determined by the microprocessor at block 216, the microprocessor control unit 34 at block 218 stops the motor 42 and at block 220 blanks the display 21 after five seconds. Thereafter, at block 222, the microprocessor control unit 34 returns to the idle mode.

If the start/stop switch 30 is touched alone prior to the expiration of the set mix time as determined by the microprocessor control unit 34 at block 224, the microprocessor at block 226 stops the motor 42 and the mix timer 35. This feature allows a user to stop the mixer while operating in the timed mixing mode to, for example, add additional ingredients to the mixing bowl. When the start/stop switch 30 is again touched as determined by the microprocessor control unit 34 at block 228 the microprocessor returns to block 210 to start the motor 42 at the slow start up speed; to restart the mix timer 35 at block 212 and to update the display 21 at block 214.

If the microprocessor control unit 34 determines at block 230 that the mix time switch 24 has been touched alone before the mix timer 35 has been decremented to 0:00, the microprocessor control unit 34 at block 232 stops the motor 2 and resets the mix timer 35 and display 21 to 0:15 at block 232. Thereafter, the microprocessor returns to block 160.

If the microprocessor control unit 34 determines at block 234 that the mix time switch 24 and start/stop switch 30 have been simultaneously touched, the microprocessor 34 at block 236 sets the index X equal to zero. At block 236 the microprocessor also resets the mix timer 35 and display 21 to 0:00. At block 238 the microprocessor control unit 34 sets and starts the five-second timer; stops the motor 42 and thereafter the microprocessor 34 returns to block 160.

While the motor 42 is running in the timed mixing mode, the speed of the motor 42 may be changed without stopping the motor 42. If the speed-up switch 26 or the speed-down switch 28 has been touched before the mix timer 35 has reached 0:00 as determined by the microprocessor control unit 34 at block 240, the microprocessor at block 234 increments or decrements the speed accordingly. Thereafter, at block 244 the microprocessor 34 controls the display 21 to display the newly selected speed for five seconds and thereafter, the time remaining in the mix timer 35.

While the motor 42 is running in the timed mixing mode, the microprocessor control unit 34 at block 246 determines whether an overload is present. If an overload is present the microprocessor control unit 34 processes the overload at block 248 as described above with reference to the normal mode of operation. If no overload exists as determined by the processor at block 246, the microprocessor control unit 34 returns to block 216.

The microprocessor control unit 34 controls the mixer 10 to operate as a utility count-down timer in response to actuation of the timer switch 22. In the utility countdown timer mode the microprocessor control unit 34, at block 250 determines whether the timer switch 22, alone, has been touched once. If it has, the microprocessor control unit 34 at block 252 increments the timer 37 and the display 21 by one minute. If instead of being touched once, the timer switch 22 is held down as determined by the microprocessor control unit 34 at bloc 254, at block 256 the microprocessor 34 slews the timer at a rate of two units per second. At block 258 the microprocessor 34 determines whether the timer 37 has been slewed for three second or less and if it has, the microprocessor 34 at block 260 continues to slew the timer 37 at a rate of two units per second. If the timer switch 22 is held down for a period greater than three seconds as determined at block 258 the microprocessor at block 262 slews the timer 37 at a rate of eight units per second. When the microprocessor control unit 34 determines at block 264 that the timer switch 22 has been released, the microprocessor at block 266 displays the time stored in the timer 37 when the switch 22 is released.

If the microprocessor control unit 34 determines that the timer switch 22 and the start/stop switch 30 have been touched simultaneously, the microprocessor control unit 34 at block 266 resets the timer 37 and the display 21 to 0:00. Thereafter, the microprocessor control unit 34 returns to block 250.

When the start/stop switch 30 is touched alone, as determined by the microprocessor control unit 34 at block 268, the microprocessor 34 at block 270 starts the timer 37 counting down. When the timer 37 counts down to 0:00 as determined by the microprocessor at block 272 the microprocessor at block 274 blanks the display after five seconds. At block 276, the microprocessor controls the speaker 38 to sound beeps and starts a beep timer. The speaker will sound the beeps until the start/stop switch 30 is touched as determined by the processor at block 278 or until the beep timer has reached ten minutes as determined by the processor at block 280. When the start/stop switch has been touched or the beeps have been sounded by the speaker 38 for a period of ten minutes, the microprocessor at block 282 stops the beeps and at block 284 returns to the idle mode. If the timer 37 has not counted down to 0:00 and the start/stop switch 30 is touched as determined by the microprocessor at block 286, the microprocessor at block 287 stops the timer 37 and returns to block 250. When operating in the utility timer mode and the mix time switch 24 is touched before the timer 37 reaches 0:00 as determined by the microprocessor 34 at block 288, the microprocessor control unit 34 at block 290 sets the mix timer 35 and the display 21 to 0:15 if the mix time switch 24 has been touched alone or if the mix time switch 24 is touched simultaneously with the start/stop switch 30, the microprocessor at block 290 sets the mix timer 35 and display 21 to 0:00 and starts the five-second timer. Thereafter, the microprocessor goes to the timed mixing mode depicted in FIGS. 6a–6c.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. An electric food mixer having a motor operable at a plurality of mixing speeds comprising:
   means actuable by a user for starting said motor; and
   means responsive to the actuation of said starting means for automatically controlling said motor to start at a start-up speed less than the slowest of said mixing speeds and to run at said start-up speed for a predetermined period of time.

2. An electric food mixer as recited in claim 1 wherein said predetermined period of time is approximately 6 seconds.

3. An electric food mixer as recited in claim 1 wherein said start-up speed is approximately 1000 revolutions per minute.

4. An electric food mixer having a motor comprising:
   means for selecting the speed of said motor from a plurality of selectable speeds;
   means actuable by a user for starting said motor; and
   means responsive to the actuation of said starting means and to said speed selection means for automatically controlling the motor to start at a start-up speed less than the slowest selectable speed, to run at said start-up speed for a predetermined period of time, and thereafter to increase in speed at a predetermined rate to the selected speed.

5. An electric food mixer as recited in claim 4 wherein said predetermined period of time is approximately 6 seconds.

6. An electric food mixer as recited in claim 4 wherein said start-up speed is approximately 1000 revolutions per minute.

7. An electric food mixer having a motor comprising:
   means actuable by a user for selecting a desired running time for said motor;
   means for monitoring the running time of said motor; and
   means responsive to said time selection means and said monitoring means for automatically stopping said motor when the motor has been running for a period of time equal to the selected running time.

8. An electric food mixer as recited in claim 7 wherein said motor is operable at a plurality of mixing speeds and further including:
   means actuable by a user for starting said motor; and
   means responsive to the actuation of said starting means for automatically controlling the motor to start at a start-up speed less than the slowest of said mixing speeds and to run at said start-up speed for a predetermined period of time.

9. An electric food mixer as recited in claim 7 wherein said motor is operable at a plurality of mixing speeds and further including:
   means for displaying speed information and remaining running time information; and
   means responsive to said starting means for controlling said display means to display speed information for a predetermined period of time upon actuation of said starting means and after said period of time to display remaining running time information.

10. An electric food mixer as recited in claim 7 further including:
    means actuable by a user for selecting the speed of said motor; and
    means responsive to the actuation of said speed selection means while the motor is running for changing the speed of said motor.

11. An electric food mixer as recited in claim 10 further including:
    means for displaying speed information and remaining running time information; and
    means responsive to the speed selection means for controlling the display means to display speed information for a predetermined period of time upon selection of a motor speed and after said period of time to display remaining running time information.

12. An electric food mixer having a motor comprising:
    means actuable by a user for selecting a desired running time for said motor;
    means actuable by a user for starting said motor;
    count-down timer means responsive to the actuation of said starting means for counting down the actual running time of said motor from said selected running time to zero; and
    motor control means responsive to said count-down timer means for automatically stopping said motor when said count-down timer reaches zero.

13. An electric food mixer as recited in claim 12 wherein said motor is operable at a plurality of mixing speeds and further including:
    means actuable by a user for starting said motor; and
    means responsive to the actuation of said starting means for automatically controlling the motor to start at a start-up speed less than the slowest of said mixing speeds and to run at said start-up speed for a predetermined period of time.

14. An electric food mixer as recited in claim 12 wherein said motor control means includes means for stopping said motor in response to the actuation of said starting means while said motor is running, said count-down timer means being responsive to the actuation of said starting means while the timer is counting to stop counting down.

15. An electric food mixer as recited in claim 12 wherein said motor is operable at a plurality of user selectable mixing speeds and further including:
    means for displaying speed information and running time information; and
    means responsive to said starting means for controlling said display means to display speed information for a predetermined period of time and after said period of time to display the time in said count-down timer means.

16. An electric food mixer as recited in claim 12 wherein said motor control means includes means for stopping said motor in response to actuation of said running time selecting means while said motor is running, said count-down timer means being responsive to the actuation of said running time selecting means while the timer is counting to reset the timer.

17. An electric food mixer as recited in claim 12 further including:
means actuable by a user for selecting the speed of said motor; and
means responsive to the actuation of said speed selection means while the motor is running for changing the speed of said motor.

18. An electric food mixer as recited in claim 12 further including:
means for displaying speed information and remaining running time information; and
means responsive to the speed selection means for controlling the display means to display speed information for a predetermined period of time upon selection of a motor speed and after said period of time to display remaining running time information.

19. An electric food mixer comprising:
a motor;
means operable when said motor is off for counting down time;
means actuable by a user for selecting the length of time said count-down timer means is to count down from; and
means for displaying the time in said count-down timer means.

20. An electric food mixer as recited in claim 19 wherein said time selecting means includes means for slewing through a series of selectable times at a first rate.

21. An electric food mixer as recited in claim 20 wherein said time selecting means includes means for slewing through said series of selectable times at a second rate greater than said first rate.

22. An electric food mixer as recited in claim 21 further including means for automatically changing the slew rate from said first rate to said second rate when said slewing means been slewing at said first rate for a predetermined period of time.

23. An electric food mixer as recited in claim 19 further including means actuable by a user for automatically resetting said display means and count-down timer means to a predetermined time.

24. An electric food mixer as recited in claim 19 further including:
means responsive to said count-down timer means counting down to zero for periodically sounding an audible tone for a first predetermined period of time; and
means actuable by a user to stop the sounding of said tone prior to the expiration of said first predetermined period of time.

25. An electric food mixer as recited in claim 24 further including means for blanking said display after said display has shown zero remaining time for a second predetermined period of time less than said first period of time.

26. An electric food mixer comprising:
at least one food beater;
a motor for rotating said beater;
means for visually displaying time;
means operable when said motor is off for controlling said display means to count down time from a selectable time; and
means actuable by a user for selecting the set time from which said controlling means controls said display to count down.

27. An electric food mixer as recited in claim 26 wherein said time selecting means includes means for slewing through a series of selectable times at a first rate.

28. An electric food mixer as recited in claim 27 wherein said time selecting means includes means for slewing through said series of selectable times at a second rate greater than said first rate.

29. An electric food mixer as recited in claim 27 further including means for automatically changing the slew rate from said first rate to said second rate when said slewing means has been slewing at said first rate for a predetermined period of time.

30. An electric food mixer as recited in claim 26 further including means actuable by a user for automatically resetting said display means to a predetermined time.

31. An electric food mixer as recited in claim 26 further including:
means for periodically sounding an audible tone for a first predetermined period of time when said display means has reached zero time; and
means actuable by a user to stop the sounding of said tone prior to the expiration of said first predetermined period of time.

32. An electric food mixer as recited in claim 31 further including means for blanking said display after said display has shown zero remaining time for a second predetermined period of time less than said first period of time.

33. An electric food mixer comprising:
at least one beater;
a motor for rotating said beater;
count-down timer means for counting down time;
first means actuable by a user for setting said count-down timer means to the desired running time of said motor;
utility timer setting means actuable by a user for setting said count-down timer means to a desired count-down time;
means actuable by a user for starting the operation of said mixer; and
means for controlling the operation of said mixer in a first mode and in a second mode, said controlling means being responsive to the actuation of said first means and said starting means to start and run said count-down timer means and said motor in a first mode, said controlling means automatically stopping said motor in response to said countdown timer means counting down to zero from the set running time, and said controlling means being responsive to the actuation of said utility timer setting means and said starting means to start said count-down timer means counting down from the set desired count-down time.

34. An electric food mixer as recited in claim 33 wherein said motor is operable at a plurality of mixing speeds and wherein said mixer further includes means responsive to the actuation of said first means and to said starting means for starting said motor at a start-up speed less than the slowest of said mixing speeds and to run at said start-up speed for a predetermined period of time.

35. An electric food mixer as recited in claim 33 wherein said motor is operable at a plurality of user selectable mixing speeds and wherein said mixer further includes:

means for displaying speed information and running time information; and display control means responsive to the actuation of said starting means and to the actuation of said first means for controlling said display means to display speed information for a predetermined period of time and after said period of time to display the time in said count-down timer means.

36. An electric food mixer as recited in claim 35 wherein said display control means further includes means responsive to the actuation of said utility timer setting means and said starting means for controlling said display means to display the time in said count-down timer means.

37. An electric food mixer as recited in claim 33 wherein said utility timer setting means includes means for slewing through a series of selectable times at a first rate.

38. An electric food mixer as recited in claim 37 wherein said utility timer setting means includes means for slewing through said series of selectable times at a second rate greater than said first rate.

39. An electric food mixer as recited in claim 38 further including means for automatically changing the slew rate from said first rate to said second rate when said slewing means has been slewing at said first rate for a predetermined period of time.

* * * * *